(12) United States Patent
Hiki

(10) Patent No.: US 6,508,225 B1
(45) Date of Patent: Jan. 21, 2003

(54) FUEL CONTROL SYSTEM FOR MARINE ENGINE

(75) Inventor: Keiichi Hiki, Iwata (JP)

(73) Assignee: Yamaha Matsudoki Kabushiki Kaisha (JP)

( * ) Notice: Subject to any disclaimer, the term of this patent is extended or adjusted under 35 U.S.C. 154(b) by 0 days.

(21) Appl. No.: 09/490,386

(22) Filed: Jan. 24, 2000

(30) Foreign Application Priority Data

Jan. 22, 1999  (JP) ............................................. 11-014704

(51) Int. Cl.[7] ................................................ F02B 77/00
(52) U.S. Cl. ............................. 123/198 D; 123/198 DB
(58) Field of Search ....................... 123/198 DB, 198 D, 123/516, 179.3, 179.17, 456, 514

(56) References Cited

U.S. PATENT DOCUMENTS

| | | | |
|---|---|---|---|
| 4,230,086 A | | 10/1980 | Lovret |
| 4,391,239 A | * | 7/1983 | Brinton et al. .......... 123/198 E |
| 5,373,820 A | | 12/1994 | Sakamoto et al. |
| 5,394,844 A | * | 3/1995 | Akimoto ................... 123/179.3 |
| 5,615,645 A | | 4/1997 | Kanno |
| 5,769,041 A | | 6/1998 | Suzuki et al. |
| 5,913,294 A | * | 6/1999 | Takahashi et al. ..... 123/198 DB |
| 5,925,089 A | | 7/1999 | Fujime |
| 5,927,253 A | * | 7/1999 | Oyafuso et al. ............ 123/516 |
| 5,937,825 A | | 8/1999 | Motose |
| 6,024,068 A | * | 2/2000 | Nakase et al. .......... 123/198 D |
| 6,067,966 A | * | 5/2000 | Saito et al. .................. 123/514 |

FOREIGN PATENT DOCUMENTS

JP           0200663      * 12/1982    ................. 123/516

* cited by examiner

*Primary Examiner*—Carl S. Miller
(74) *Attorney, Agent, or Firm*—Knobbe, Martens, Olson & Bear, LLP

(57) ABSTRACT

A fuel injected watercraft engine includes a controller for continuing the operation of an electric fuel pump for a predetermined time period after the engine has been stopped. The control system additionally may include a routine for stopping the fuel pump if the lanyard switch is tripped or the watercraft is capsized.

7 Claims, 8 Drawing Sheets

FUEL CONTROL SYSTEM FOR MARINE ENGINE

PRIORITY INFORMATION

This application is based on and claims priority to Japanese Patent Application No. 11-14704, filed Jan. 22, 1999, the entire contents of which is hereby expressly incorporated by reference.

BACKGROUND OF THE INVENTION

1. Field of the Invention

The present invention primarily relates to fuel injected engines. More particularly, the present invention relates to a control strategy for controlling a fuel pump of a fuel injected engine after shutdown.

2. Description of the Related Art

Personal watercraft, like other applications that use internal combustion engines as power sources, are experiencing considerable public and governmental pressure to improve not only their performance, but also their exhaust emissions levels. For example, due to the emissions generated by two-stroke powered watercraft, certain recreational areas have banned the operation of such watercrafts. These bans have decreased the popularity of personal watercraft, and have caused manufacturers of these types of watercraft to consider fuel injected engines to power their watercraft and/or other means to reduce emissions levels.

Fuel injected engines are known to provide significantly enhanced performance, power output, and emission control as compared to carbuerated engines. Direct cylinder injection may be accompanied by stratification or lean burning operation to further fuel economy and emission control.

Fuel injection, however, is not easily applied to the engines of personal watercraft. A personal watercraft by its very nature is small and the engine compartment and space for the engine and its auxiliaries is limited. Personal watercraft are generally designed to be operated by a single rider and to carry up to three additional passengers. Thus, not only is the space inside the engine compartment limited but the accessibility of the engine compartment is also limited.

When direct cylinder injection is employed, a high pressure fuel pump is used in order to elevate the fuel to a pressure sufficient for injection into the combustion chambers of the engine, as the pistons in each cylinder approach top dead center (TDC). Direct injection thus requires considerably higher injection pressures than manifold type fuel injection.

Fuel pressures sufficient for direct cylinder injection can be achieved through the use of positive displacement pumps, which are driven mechanically by the output shaft of the engine via a pump drive. The pump drive, however, presents a significant problem in personal watercraft because of the limited space available within the hull.

SUMMARY OF THE INVENTION

A need therefore exists for a direct injected engine for a watercraft which operates properly under all operating conditions. For example, it is desirable to provide a direct injected engine for a watercraft which can be stopped and quickly and repeatedly started for short periods of operation.

In accordance with one aspect of the present invention, a fuel injected internal combustion engine comprises an engine body defining at least one combustion chamber. A fuel injector selectively communicates with the combustion chamber to provide a fuel charge to the combustion chamber. A fuel pump supplies fuel to the fuel injector. The engine also includes a controller connected to the fuel pump and configured to operate the fuel pump for a predetermined time period after the engine has been stopped.

For example, the controller continues to operate the fuel pump for the predetermined time period beginning when a user has tripped a kill switch, a lanyard switch or removed a key from a locking ignition switch, although the engine may continue to rotate under its own momentum and/or combustion caused by ignition of residual fuel vapors remaining in the combustion chamber after the engine has been "stopped." Such acts, e.g., tripping a kill or lanyard switch or removing an ignition key, can cause the engine controller to cease spark ignition and/or fuel injection so as to "stop" the engine.

By providing the engine with a controller that is configured to operate the fuel pump for a predetermined time period after the engine is stopped, the fuel system of the engine remains primed during the predetermined time period after the engine has been stopped.

It is appreciated that the present fuel injected engine and control strategy has particular utility in marine applications when the engine drives a jet propulsion unit. For instance, when a user is operating a personal watercraft and is approaching a pier or a dock, the user typically maneuvers the watercraft by starting and stopping the engine. The repeated starting and stopping of the engine is effective for docking maneuvers because personal watercraft typically do not have rudders or transmissions with a neutral position. Rather, personal watercraft are usually driven by jet propulsion units which are directly connected to an output shaft of the engine, without the use of a forward, neutral, reverse transmission. In such watercraft, steering forces are generated by directing water from the jet propulsion device at a desired angle, which the rider controls by adjusting a steering nozzle. The propulsion force also is always present when the engine is running.

When a rider decides to dock such a watercraft, the rider typically kills the engine by actuating a kill switch and coasts towards a dock. However, as the watercraft approaches the dock, the user repeatedly starts and stops the engine using a start switch and the kill switch, respectively. In this manner, the rider can slowly and incremental he moved the watercraft closer to the dock as well as steer the watercraft into a docking position. The personal watercraft finally reaches the dock after repeated starts and stops.

An aspect of the present invention involves the recognition that when a conventional engine embodying direct cylinder injection is stopped and the starter button is subsequently depressed, there is a delay created during which the fuel system repressurizes, before the engine can run properly. This delay increases the difficulty of docking maneuvers, making such maneuvers more clumsy and difficult to perform.

For example, high pressure fuel pumps for direct cylinder injected engines typically operate at approximately 50 kg/cm$^2$. When a direct cylinder injection engine is stopped, the fuel pressure on the input side of the high pressure fuel pump drops quickly. As the pressure drops on the input side of the pump, the fuel drains away from the pump, thus allowing the pump to fall quickly into an un-primed state. When such a direct cylinder injected engine is subsequently re-started, a time lag occurs during which the electric fuel pump operates before the high pressure fuel pump is re-primed. This time lag interferes with quick and repetitive stops and efficient restarts of the engine, thus making docking maneuvers more difficult.

By configuring the fuel pump controller to continue the operation of the fuel pump after the engine has been stopped for a predetermined period of time, the high pressure fuel PUMP is prevented to from falling into an un-primed state during such period, thus reducing a time lag associated with re-pressurization of the fuel system when quickly restarted. Therefore, when a user is performing a docking maneuver, the user can stop and restart the engine more quickly and efficiently, thereby making docking maneuvers easier to perform Further aspects, features, and advantages of the present invention will become apparent from the detailed description of the preferred embodiment which follows.

BRIEF DESCRIPTION OF THE DRAWINGS

The above-mentioned and other features of the invention will now be described with reference to the drawings of a preferred embodiment of a fuel injected engine. The illustrated embodiment of the engine is intended to illustrate, but not to limit, the invention. The drawings contain the following figures.

DETAILED DESCRIPTION OF THE PREFERRED EMBODIMENT

An improved engine for a personal watercraft is disclosed herein. The engine includes a fuel control system for supplying fuel to the engine provided within the watercraft, which continues the operation of a fuel pump for a predetermined time period after the engine has been stopped. Thus, the engine may be restarted quickly, thereby enhancing the responsiveness of the engine during docking maneuvers. Although the present engine is illustrated in connection with a personal watercraft, the illustrated engine can be used with other applications as well, such as, for example, and without limitation, outboard motors, small jet boats and a variety of other engine applications.

Figure 1:
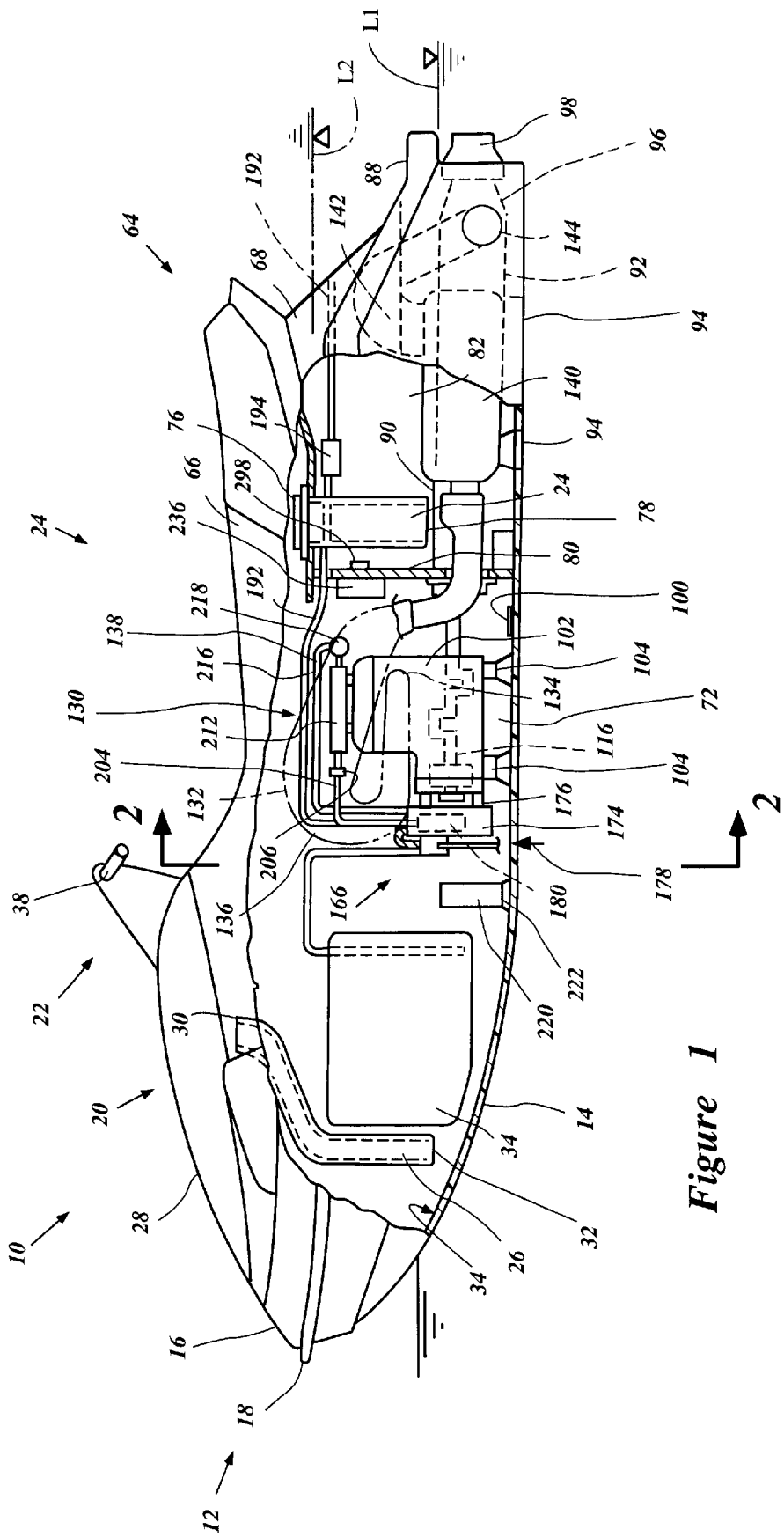
FIG. 1 is a partial cutaway side elevational view of a personal watercraft having an engine constructed in accordance with a preferred embodiment of the invention, with several internal components shown in phantom line and others shown partially in section.
Figure 2:
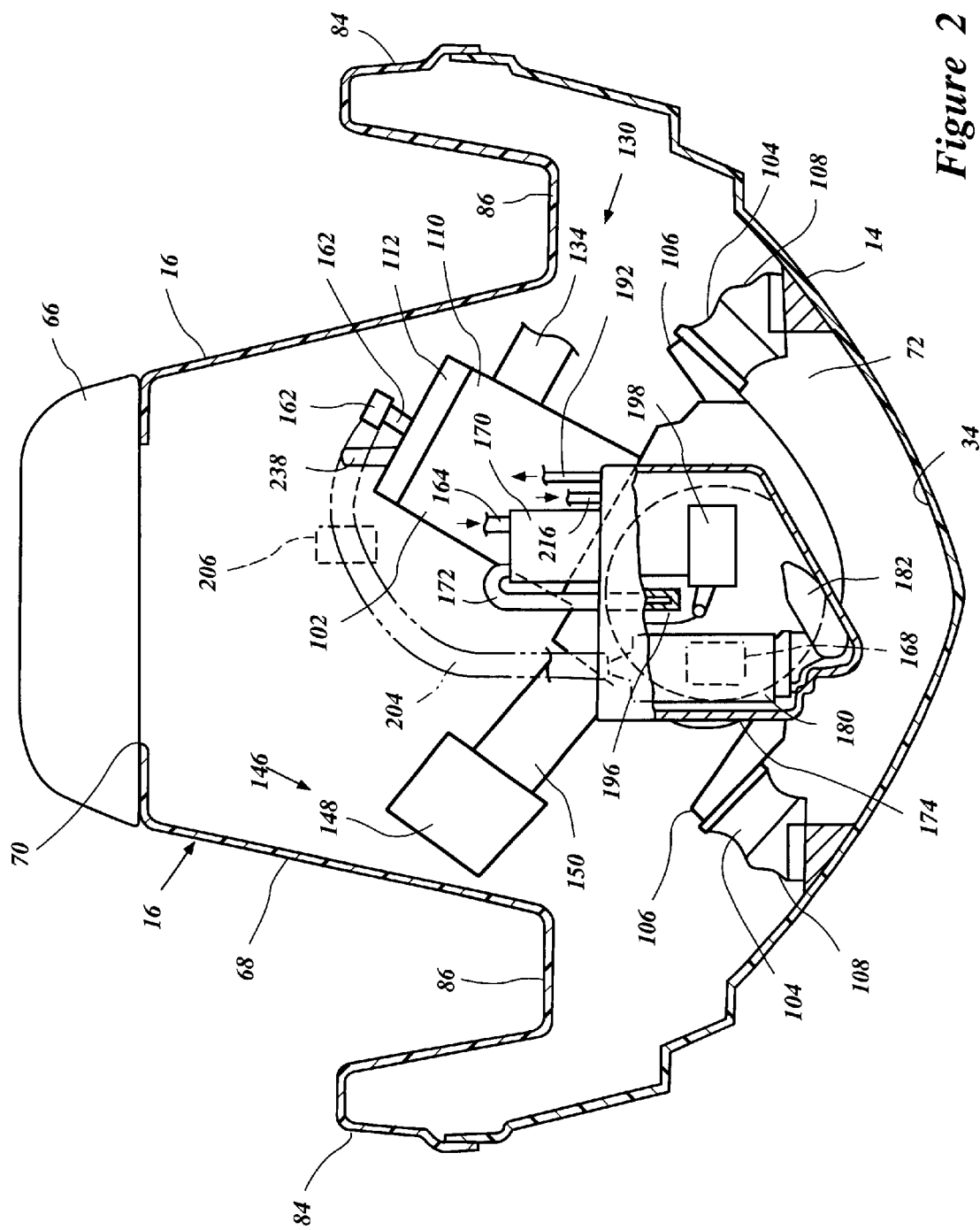
FIG. 2 is a cross-sectional view along line 2—2 of the watercraft shown in FIG. 1, with certain components omitted.
Figure 3:
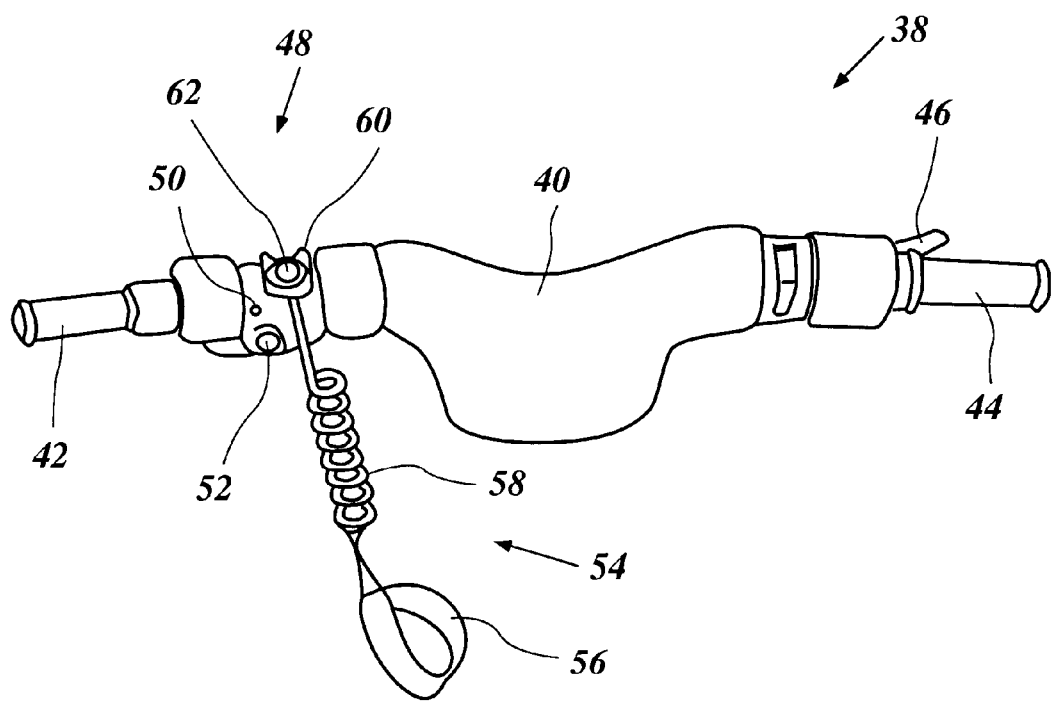
FIG. 3 is a top, rear, and left side perspective view of a handlebar assembly and lanyard switch included in the watercraft shown in FIG. 1.

With initial reference to FIGS. 1–3, a watercraft 10 includes a hull 12 formed of a lower hull section 14 and an upper hull section 16. The hull sections 14 and 16 are formed of a suitable material, such as, for example, a molded fiberglass reinforced resin or a sheet molding compound. The lower hull section 14 and the upper hull section 16 are fixed together around the peripheral edges or gunnels 18 in any suitable manner.

As viewed in a direction from bow to stern of the watercraft 10, the upper hull section 16 includes a bow portion 20, a control mast portion 22, and a rider's area 24. The bow portion 20 slopes upwardly towards the control mast 22 and includes at least one air duct 26 through which air enters the hull 12. A hatch cover 28 desirably extends above an upper inlet 30 of the air duct 26 to inhibit an influx of water into the hull 12. As shown in FIG. 1, the air duct 26 terminates at a lower end opening 32 located near a lower surface 34 of the lower hull section 14.

A fuel tank 36 is located within the hull 12 beneath the hatch cover 28. Conventional means, such as, for example, straps, secure the fuel tank 36 to the lower hull section 14. A fuel filler hose (not shown) preferably extends between the fuel tank 36 and a fuel cap assembly arranged on the bow portion 20, to the side and in front of the control mast 22. In this manner, the fuel tank 36 can be filled from the outside of the hull 12 with the fuel passing through the fuel filler hose into the fuel tank 36.

The control mast 22 extends from the bow portion 20 and supports a handlebar assembly 38. As shown in FIG. 3, the handlebar assembly 38 includes a pivotal mount 40 pivotally connected to the control mast 22. A pair of handles 42 and 44 extend from each end of the pivotal mount 40 so as to allow an operator to grasp the handles 42, 44 and steer the watercraft 10.

A throttle lever 46 is provided adjacent handle 44. The throttle lever 46 is pivotally mounted to the handlebar assembly 38. Adjacent the handle 42, the handlebar assembly 38 includes a control box 48. The control box 48 includes a starter actuator 50, a kill switch actuator 52 and a lanyard 54.

The starter actuator 50 preferably is in the form of a button configured to actuate a starter mechanism, in a known manner, for starting an engine 102, the construction of which is described in detail below. The starter actuator 50 is arranged on the control box 48 so as to be conveniently located for actuation by a user's thumb.

The kill switch actuator 52 is constructed as a button mounted on the control box 48. The kill switch actuator 52 is operatively connected to the engine 102 so as to cause the engine 102 to stop during operation when actuated. For example, the kill switch actuator 52 may be configured to cut off electrical energy to the ignition system of the engine 102 (e.g. cease spark plug firing) or to the fuel injection system (e.g., cease energizing the fuel injector solenoids). As shown in FIG. 3, the kill switch actuator 52 is arranged on the control box 48 so as to be conveniently actuated by a user's thumb.

The lanyard assembly 54 includes an anchoring strap 56, a cord 58, a spacer element 60 and button 62. The anchoring strap 56 may have any configuration appropriate for being securely attached to a portion of the user's body. For example, the anchoring strap 56 may be configured to fit around a user's wrist or waist. The cord 58 preferably is in a coil configuration so as to be expandable in a lengthwise direction and such that at least a minimal amount of tension is maintained within the cord 58 so as to avoid the entanglement of the cord 58 during operation of the watercraft 10. The spacer element 60 cooperates with the button 62 so as to actuate an additional kill switch (not shown) when the spacer element is removed from the button 62 in a known manner.

In operation, a user grasps handles 42, 44 to steer the watercraft 10. The user operates the throttle lever 46 in order to control the power output of the engine 102. In order to start the engine 102, the user depresses the starter actuator 50 to actuate a starter motor of the engine 102. When the operator wishes to cease engine operation, the operator may push the kill switch actuator 52.

Additionally, during operation, the anchor portion 56 of the lanyard assembly 54 should be secured to an operator's wrist or waist, for example. Anchored as such, if the rider leaves the rider's area 24 during operation, the spacer portion 60 will be pulled from the button portion 62, thereby activating the additional kill switch so as to stop the operation of the engine 102.

The rider's area 24 lies behind the control mast 22 and includes a seat assembly 64. In the illustrated embodiment, the seat assembly 64 has a longitudinally extending straddle-type shape that can be straddled by an operator and by at least one, two, or three passengers. The seat assembly 64 is, at least in principle part, formed by seat cushion 66 supported by raised pedestal 68. The raised pedestal 68 has an elongated shape and extends longitudinally along the center of the watercraft 10. The seat cushion 66 desirably is removably attached to the top surface of the pedestal 68 and covers the entire upper end of the pedestal 68 for the rider's and passenger's comfort.

In the illustrated embodiment, the seat cushion 66 has a single piece construction. Alternatively, the seat cushion 66 may be formed in sectional pieces which are individually attached to the seat pedestal 68. In this manner, one sectional piece of the seat cushion 66 can be removed to expose a portion of the watercraft beneath the seat cushion 66, without requiring removal of the other sectional pieces. For instance, a rear sectional piece of the seat cushion 66 can be removed to gain access to a storage compartment located beneath the seat without requiring removal of a front sectional piece of the seat cushion 66.

As shown in FIG. 2, an access opening 70 is located on an upper surface of the seat pedestal 68. The access opening 70 opens into an engine compartment 72 formed within the hull 12. The seat cushion 66 normally covers and seals the access opening 70. When the seat cushion 66 is removed, the engine compartment 72 is accessible through the access opening 70.

As shown in FIG. 1, the seat pedestal 68 desirably includes at least one air duct 74 located behind the access opening 70. The air duct 74 communicates with the atmosphere through an upper end port 76 located within a space between the pedestal 68 and the seat cushion 66 and rearward from the access opening 70. The rear duct 74 terminates in a lower end opening 78.

As shown in FIG. 1, the hull 12 preferably includes a bulkhead 80 mounted rearward from the access opening 70. The bulkhead 80 cooperates with the seat pedestal 68 so as to define a propulsion unit chamber 82. The rear air duct 76 terminates at a position within the propulsion unit chamber 82. Air can pass through the rear air duct 76 in both directions.

As shown in FIG. 2, a bulwark 84 extends outwardly along each side of the watercraft 10. A footwell 86 is defined between each side of the pedestal 68 and the bulwark 84. In the illustrated embodiment, the footwells 86 extend entirely along the length of the seat assembly 64 and open into a rear deck 88 (FIG. 1) that is located at the aft of the watercraft 10, above the transom. The footwells 86, however, can be closed at the aft and with a suitable drainage system provided.

The hull 12 is configured such that the watercraft 10 has sufficient buoyancy to float in a body of water in which the watercraft 10 is operated, regardless of the orientation of the hull 12 in the water. That is, as appreciated from FIG. 1, line L1 represents the water surface level relative to the watercraft 10 when the watercraft 10 is upright and at rest in a body of water. In contrast, a L2 represents the water surface level relative to the watercraft 10 when the watercraft 10 is capsized in a body of water.

With reference to FIG. 1, the lower hull section 14 is designed such that the watercraft 10 planes or rides on a minimum surface area at the aft end of the lower hull section 14 in order to optimize the speed and handling of the watercraft 10 when up on plane. For this purpose, the lower hull section 14 generally has a V-shaped configuration, as is apparent from FIG. 2, formed by a pair of inclined sections that extend outwardly from the centerline of the hull 12 to the hull's sidewalls at a dead rise angle. The inclined sections also extend longitudinally from the bow 20 toward the transom of the lower hull section 14. The sidewalls are generally flat and straight near the stern of the hull and smoothly blend towards the longitudinal center of the watercraft at the bow 20. The lines of intersection between the inclined sections and corresponding sidewalls form the outer chines of the lower hull section 14.

Toward the transom of the watercraft 10, the inclined sections of the lower hull 14 extend outwardly from a recessed channel or tunnel 90 that extends upwardly toward the upper hull portion 16. The tunnel 90 generally has a parallelepiped shape and opens through the transom of the watercraft 10.

As shown in FIG. 1, a jet pump unit 92 is provided in the lower surface of the lower hull section 14 which opens into a gullet of an intake duct 94 leading to the jet pump unit 92. The intake duct 94 leads to an impeller housing assembly in which an impeller (not shown) of the jet pump unit 92 operates. The impeller housing assembly also acts as a pressurization chamber and delivers a flow of water from the impeller housing to a discharge nozzle 96.

A steering nozzle 98 is supported at a downward stream end of the discharge nozzle 96 by a pair of vertically extending pivot pins. In an exemplary embodiment, the steering nozzle 98 has an integral lever on one side that is coupled to the handlebar assembly 38, through, for example, a bowden-wire actuator, as known in the art. In this manner, the operator of the watercraft 10 can move the steering nozzle 98 to affect directional changes of the watercraft 10.

A ride plate covers a portion of the tunnel behind the inlet opening 94 to close the jet pump unit 92 within the tunnel 90. In this manner, the lower opening of the tunnel is closed to provide a plane surface for the watercraft 10.

With reference to FIG. 1, the watercraft 10 may include a bilge system for removing water from the engine compartment 72 of the watercraft 10. The bilge system includes a water pickup 100 located on the lower surface 36 of the engine compartment 72, and at the aft end of the engine compartment 72, adjacent the bulkhead 80. The bilge system may employ a venturi-type pump by utilizing a reduced pressure area formed within the jet pump unit 92. For this purpose, a bilge line may connect the water pickup 100 to the jet pump unit 92. The bilge system can alternatively include a mechanical bilge pump driven by an electric motor (not shown).

An internal combustion engine 102 of the watercraft 10 powers the impeller shaft to drive the impeller of the jet pump unit 92. As shown in FIGS. 1 and 2, the engine 102 is positioned within the engine compartment 72 and is mounted behind the control mast 22, beneath the seat assembly 64. In the illustrated embodiment, the engine 102 is arranged at a longitudinal position that is generally beneath the access opening 70 formed on the upper surface of the seat pedestal 68.

In the illustrated embodiment, the engine includes two inline cylinders and operates on a two-stroke, crankcase compression principle. The axis of each cylinder is generally inclined relative to a vertical plane of the watercraft 10, in which a longitudinal axis of the watercraft 10 lies. This engine type, however, is merely exemplary. Those skilled in the art will readily appreciate that the present fuel control system, described in detail below, can be used with a variety of engine types having other numbers of cylinders, having other cylinder arrangements and orientations, and operating on other combustion principles (e.g., four-stroke and rotary principles).

With reference to FIGS. 1 and 2, vibration absorbing engine mounts 104 secure the engine 102 to the lower surface 34 of the lower hull section 14. As best seen in FIG. 2, the engine mounts 104 are attached to the engine 102 by a first set of brackets 106 and are attached to the lower surface 34 of the lower hull portion 14 by a second set of brackets 108. The lower brackets 108 are arranged to support the engine 102 at a distance above the lower surface 34 of the lower hull section 14, and at a desired location within the engine compartment 72.

Figure 5:
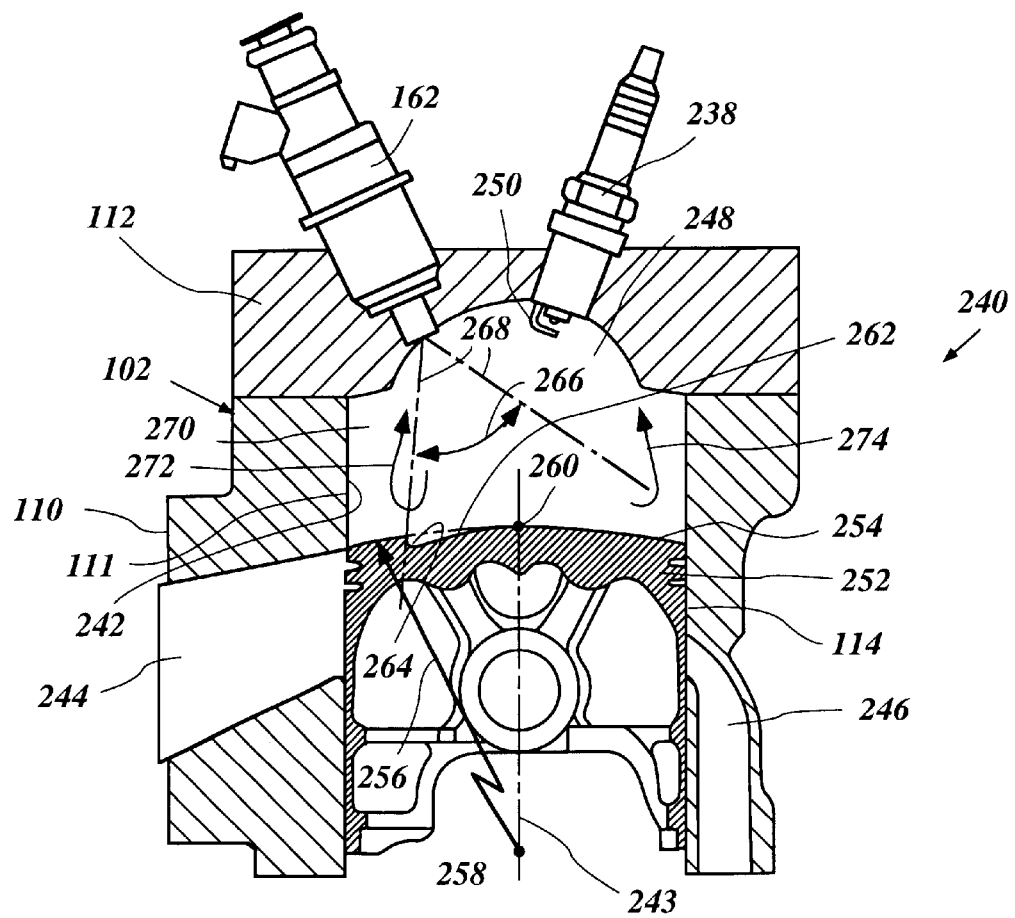
FIG. 5 is a cross-sectional view of a cylinder block, cylinder head and piston head included in the engine shown in FIG. 2.

As best seen in FIG. 5, a cylinder block 110 and a cylinder head 112 desirably form at least one cylinder 111 of the engine 102. In the illustrated embodiment, the cylinder block and the cylinder head together define both cylinders of the engine; however, separate cylinder bodies and separate cylinder heads can be used to form each cylinder of the engine, as known in the art, with each cylinder body connected to a common crankcase.

Figure 4:
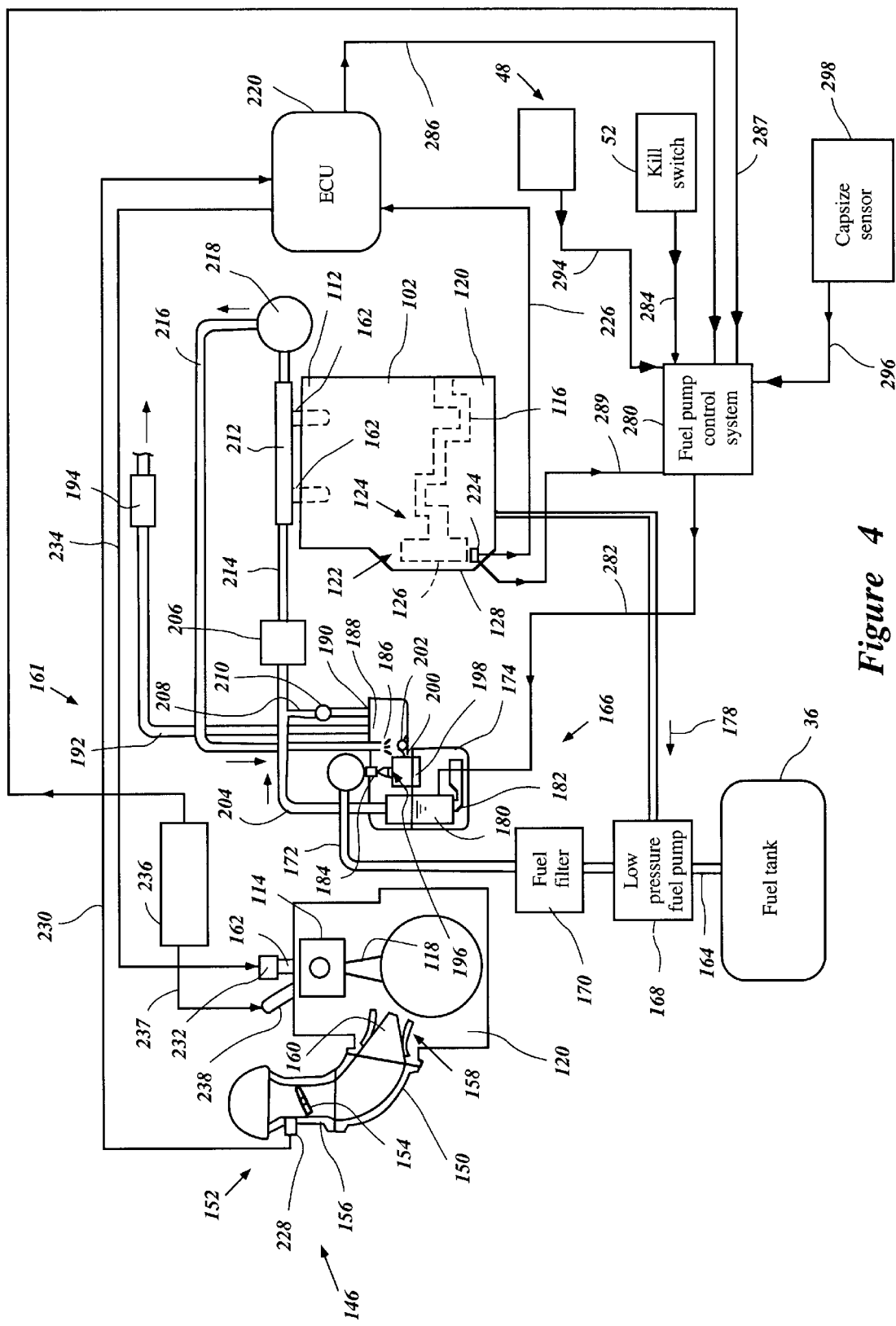
FIG. 4 is a schematic representation of the fuel delivery and induction systems of the engine shown in FIG. 2.

As shown schematically in FIG. 4, a piston 114 reciprocates within each cylinder 111 of the engine 102. A variable volume combustion chamber is formed in each cylinder between the corresponding piston, cylinder wall and recess of the cylinder head. The specific constructions of the cylinders, cylinder head and pistons will be described below in greater detail in connection with FIGS. 5–10.

The pistons together drive an output shaft, such as a crankshaft 116, of the engine 102. A connecting rod 118 links each corresponding piston 114 to the crankshaft 116.

The crankshaft 116 desirably is journaled within a crankcase 120. The crankcase 120 is divided into a number of individual crankcase chambers by dividing walls of the crankcase and sealing disks of the crankshaft. Each crankcase chamber is sealed from one another and communicates with a dedicated combustion chamber. Each crankcase chamber also communicates with an induction system (which is described below in detail).

As shown in FIG. 4, the crankshaft 116 carries a flywheel assembly 122 on a front end 124 of the crankshaft 116. The flywheel assembly 122 desirably includes a flywheel magneto 126. A cover 128 is attached to the crankcase 120 so as to enclose the flywheel assembly 122.

With reference to FIG. 1, an exhaust system 130 is provided to discharge exhaust byproducts from the engine 102 to the atmosphere and/or into the body of water in which the watercraft 10 is operated. The exhaust system 130 is formed of an exhaust conduit 132 which communicates with the combustion chambers defined in the engine 102 and is configured to discharge the exhaust gases to the atmosphere.

The exhaust conduit 132 includes an exhaust manifold 134 affixed to a side of the cylinder block 110 so as to receive exhaust gases from the combustion chambers through exhaust ports in a well known manner. At an outlet end, the exhaust manifold 134 communicates with a C-shaped pipe section 136. The C-shaped pipe section 136 includes at least one expansion chamber 138. A discharge end of the expansion chamber 138 forms a downwardly turned portion. The downwardly turned portion communicates with at least one water trap device 140, which lies on one side of the tunnel 90.

The water trap device 140 has a sufficient volume to retain water and to preclude the backflow of water to the expansion chamber 138. Internal baffles within the water trap device 140 help control water flow through the exhaust system 130.

An exhaust pipe 142 extends from an outlet section of the water trap device 140 and wraps over the top of the tunnel 90 to a discharge end 144. The discharge end 144 desirably opens into the tunnel 90 in an area that is close to or below the water line L1.

As shown in FIGS. 2 and 4, an induction system 146 is located on a side of the engine 102 opposite the exhaust system 130 and supplies air to the variable volume chambers within the engine 102. In the illustrated embodiment, the induction system 146 includes an air intake silencer 148 which is connected to the variable volume chambers through a number of intake runners 150 corresponding to the number of cylinders within the engine 102. In the illustrated embodiment, there are two intake runners 150.

The intake silencer 148 communicates with at least one and preferably a plurality of throttle devices 152. The engine 102 desirably includes a number of throttle devices 152 equal in number to the number of cylinders within the engine 102. In the illustrated embodiment, a throttle shaft supports a butterfly-type valve plate 154 within a throat 156 of the throttle device 152.

Each throttle device 152 communicates with an intake manifold through one of the intake runners 150. The intake manifold is attached to the crankcase 120 and/or the cylinder block 110 to place each intake runner 150 in communication with one of the crankcase chambers. In the illustrated embodiment, the intake runner 150 desirably has an arcuate shape with a portion of the runner 150 extending generally transverse to a rotational axis of the crankshaft 116 as well as the longitudinal axis of the watercraft 10. As a result, the throttle device 152 and the intake silencer 148 are distanced from the cylinder block 110 and the cylinder head assembly 112.

A check valve (e.g., a reed valve) is disposed within a port between each intake runner 150 and the corresponding crankcase chamber. In the illustrated embodiment, a reed valve assembly 158 includes a pair of reed valves 160 which open upon upward movement of the piston 114 to permit an influx of air into the corresponding crankcase chambers and which close upon downward movement of the piston 114, to inhibit reverse air flow from the crankcase chamber through the port.

A fuel system 161 of the illustrated embodiment is designed for direct cylinder injection of fuel through fuel injectors 162. The engine 102 desirably includes the same number of fuel injectors 162 as the number of cylinders 111. In the illustrated embodiment, the fuel injectors 162 spray fuel directly into the cylinders 111 defined in the cylinder block 110 so as to operate under the direct injection principle.

As shown in FIG. 4, a fuel supply line 164 connects the fuel tank 36 with the vapor separator assembly 166. A low pressure fuel pump 168 and a fuel filter 170 are provided along the fuel supply line 164, between the fuel tank 36 and the vapor separator assembly 166. A fuel filter outlet pipe 172 connects the fuel filter 170 with the vapor separator assembly 166.

As shown in FIG. 1, the vapor separator assembly 166 preferably is mounted directly to the engine 102 via a plurality of elastic members 176. By mounting the vapor separator assembly 166 directly to the engine 102 with the elastic members 176, vibration transferred to the vapor separator assembly 166 is attenuated.

The low pressure fuel pump 168 can either be mechanically or electrically driven. For instance, in the illustrated embodiment, the low pressure fuel pump 168 is a diaphragm pump operated by the change in pressure within one of the crankcase chambers, via a pressure line 178. The pump 168, however, can be an impeller pump driven by an electric motor (not shown) or mechanically driven off of the crankshaft.

With reference to FIG. 4, the vapor separator assembly 166 includes a fuel bowl 174, which acts as a housing for the vapor separator assembly and an electrically driven fuel pump 180 which is positioned within the fuel bowl 174 of the vapor separator assembly 166. The fuel bowl 174 desirably includes a sloped bottom surface to funnel fuel towards an influent port 182 which is positioned generally at the bottom of the fuel bowl 174.

The fuel bowl 174 also defines an inlet port 184, a high pressure fuel return port 186, a vapor discharge port 188, and a low pressure vapor return port 190. The vapor discharge port 188 is positioned on a side of the inlet port 186 at a position proximate to the upper end of the fuel bowl 174. A breather conduit 192 allows excess vapor to vent to the atmosphere. Preferably, the breather conduit 192 includes an anti-backflow device 194 for preventing the influx of water into the fuel system when the watercraft 10 is capsized. Alternatively, the breather conduit 192 may be routed to return vapor to the fuel tank 36.

The inlet port 184 connects the fuel supply line 172 with the fuel bowl 174. A needle valve 196 operates at a lower end of the intake port 184 to regulate the amount of fuel within the fuel bowl 174. A float 198 within the fuel bowl 174 actuates the needle valve 196. The float 198 includes a buoyant body supported by a pivot arm 200.

The pivot arm 200 is pivotally attached to an inner flange within the fuel bowl 174 by a pivot shaft 202 at a point proximate to the lower end of the inlet port 184. Movement of the pivot arm 200 causes the needle valve 196 to open and close the inlet port 184 by either seating against or moving away from the valve seat, depending on the rotational direction of the pivot arm 200.

In the illustrated embodiment, the pivot arm 200 rotates about the pivot shaft 202 which extends in a direction generally transverse to the longitudinal axis and the direction of travel of the watercraft 10. Oriented as such, the pivot shaft 202 generally isolates the function of the float 198 from turning movements of the watercraft 10. That is, the movement of the watercraft 10, when turning, does not cause the float 198 to rotate about the pivot shaft 202. The pivot shaft 202, alternatively, may be arranged so as to extend in a direction generally parallel to the direction of travel of the watercraft 10 in order to isolate the float 198 from movements produced when the watercraft 10 accelerates or decelerates.

As shown in FIG. 4, a low pressure vapor return line 208 communicates with the vapor return port 190 via a low pressure vapor return valve 210.

In operation, the low pressure portion of the fuel delivery system 161 operates to maintain a pre-selected amount of fuel within the fuel bowl 174. For example, the low pressure fuel pump 168 draws fuel through a stand pipe in the fuel tank 36. The fuel is pressurized by the low pressure fuel pump 168, and is thereby urged through the fuel filter 170 and the fuel filter outlet pipe 172.

When the fuel bowl 174 contains a low level of fuel, the float 198 floats in a lower position, as shown in FIG. 4. The needle valve 196 is opened by the float 198 in this lower position and fuel flows from the fuel filter outlet pipe 172 and into the fuel bowl 174.

When the fuel bowl 174 contains a preselected amount of fuel, the float 198 rises to a level where it causes the needle valve 196 to seat against the valve seat at the lower end of the inlet port 184. The preselected amount of fuel desirably lies below the inlet port 184, the return port 186, and the vapor discharge port 188. As such, the low pressure portion of the fuel delivery system maintains a predetermined amount of fuel in the fuel bowl 174 as a reservoir for the high pressure portion of the fuel delivery system 161.

The high pressure portion of the fuel delivery system is designed to pressurize fuel from the fuel bowl 174, and deliver the pressurized fuel to the fuel injectors 162. In the illustrated embodiment, a high pressure fuel delivery line 204 connects the electric fuel pump 180 with a high pressure fuel pump 206.

The high pressure fuel pump 206 may be formed of a centrifugal pump; however, other types of pumps, such as rotary vein pumps, can be used as well. Alternatively, the high pressure pump 206 may be driven directly by the crankshaft 116. U.S. patent application Ser. No. 09/436,575 filed Nov. 9, 1999, the entire contents of which is hereby expressly incorporated by reference, describes in detail a preferred embodiment of the drive mechanism for driving a high pressure fuel pump by an output shaft of an internal combustion engine, such as a crankshaft.

As shown in FIG. 4, the high pressure fuel pump 206 communicates with a fuel rail or delivery line 212 via a conduit 214. A check valve (not shown) is disposed within the conduit 214 to prevent a backflow of fuel from the fuel rail 212.

The fuel rail 212 has an elongated shape. An inlet port of the fuel rail 212 communicates with the conduit 214 which carries fuel from the high pressure fuel pump 206. The inlet port opens into a manifold chamber which extends along the length of the fuel rail 212.

The fuel rail 212 communicates with each fuel injector 162. In particular, the manifold chamber of the fuel rail 212 communicates with each of a plurality of supply ports defined along the length of the fuel rail 212. Each supply port receives an inlet end of the corresponding fuel injector 162.

In the illustrated embodiment, the fuel rail 212 lies generally parallel to the direction of travel of the watercraft 10, as well as the longitudinal axis of the watercraft 10 and the rotational axis of the crankshaft 116. The conduit 214 is desirably attached to the forward end of the fuel rail 212, such that fuel flows through the fuel rail 212 in the direction from bow to stem in order to utilize the momentum of the fuel toward the watercraft stem to increase the pressure within the fuel rail 212. As a result, a smaller size high pressure fuel pump 206 can be used. Alternatively, the conduit 214 can be attached to a rear portion of the fuel rail 212, so that the fuel flows in the opposite direction, i.e., stem to bow, but this would require a larger size high pressure fuel pump 206.

In the illustrated embodiment, a fuel return line 216 extends between an outlet port of the fuel rail 212 and the fuel bowl 174 of the vapor separator assembly 166. A pressure regulator 218 is provided in the fuel return line 216. The regulator 218 regulates pressure by dumping excess fuel back to the vapor separator assembly 166. The high pressure portion of the fuel delivery system, however, can be configured without a return line and pressure regulator, as known in the art.

The return line 216 completes a flow loop defined by the high pressure side of the fuel supply system to maintain a substantially constant flow of fuel through the fuel rail 212. The constant flow of fuel through the high pressure side of the fuel delivery system inhibits heat transferred to the fuel and thus attenuates fuel vaporization in the fuel rail 212.

In operation, the high pressure fuel pump 206 is supplied with fuel from the electric pump 180 which draws in fuel from the influent port 182. The electric fuel pump 180 pressurizes fuel to an elevated pressure and thereby pushes the fuel to the high pressure fuel pump 206. The pressure of the pressure fuel is limited by the pressure fuel regulator 210. The low pressure fuel regulator 210 dumps fuel back to the fuel bowl 174, to thereby supply fuel at generally a constant pressure to the high pressure fuel pump 206. Thus, while the electric fuel pump 180 is operating, the high pressure fuel pump 206 is maintained in a primed state.

The high pressure fuel pump 206 pressurizes the fuel received from the electric fuel pump 180 to a pressure sufficient for direct cylinder injection and thereby pushes the fuel to the fuel rail 212. The fuel within the fuel rail 212 is maintained at a desired pressure by the interaction between the high pressure fuel pump 206 and the pressure regulator 218. The fuel injectors 162 are selectively operated to inject the pressurized fuel from the fuel rail 212 directly into the cylinders.

With reference to FIG. 4, an engine control system manages the operation of at least some components of the engine 102. The control system includes an electronic control unit (ECU) 220 that receives signals from various sensors regarding a variety of engine functions. As shown in FIG. 1, ECU 220 is mounted within the hull 12 via a support member 222 fixed to the lower hull section 14.

As schematically illustrated in FIG. 4, a crank sensor 224 is mounted adjacent to the flywheel 122 and is configured to sense the angular position and speed thereof. The crank sensor 224 is electronically connected with the ECU 220 via an engine speed data line 226. A throttle position sensor 228 is mounted to the throttle valve 152 so as to sense a position thereof. The throttle position sensor 228 is electronically connected to the ECU 220 via a throttle data line 230.

In operation, the crank position sensor 224 senses the angular position of the crankshaft 116 and also the speed of its rotation. The sensor 224 produces a signal indicative of an angular orientation and/or speed, and directs the signal to the ECU 220 via the engine speed data line 226. The throttle position sensor 228 produces a signal indicative of the throttle valve position and directs the signal to the ECU 220 via the throttle data line 230.

The ECU 220 receives the signals from the sensors 224, 228 to control injection timing and duration. For this purpose, the ECU 220 communicates with each fuel injector 162, and specifically the solenoids 232 of each fuel injector 162, via a fuel injector control line 234. The ECU 220 controls the operation of the solenoids 232 in order to manage fuel injection timing and duration, the latter affecting the fuel air ratio of the produced fuel charge.

The desired stoichiometric fuel/air ratio will depend upon the amount of air flow into the engine 102, which is a function of the opening degree of the throttle valve 152. This information is stored within a memory device with which the ECU 220 communicates.

The ECU 220 thus processes the information signal received from the throttle valve sensor 228 and determines the amount of fuel to be injected for the sensed operating condition of the engine. The ECU also uses the information from a crank sensor 224 to determine the point during the engine's revolution to initiate fuel injection appropriate for each fuel injector 162.

The engine control system also includes a controller 236 for controlling ignition timing. For this purpose, the controller 236 includes a capacitor discharge ignition unit and is connected to spark plugs 238 via an ignition data line 237. The controller 236 desirably controls the discharge of one ignition coil for each spark plug 238.

The arrangement of the components of the engine 102, engine control system, the fuel supply system 161, and the exhaust system 130 are illustrated in FIGS. 1–4. As shown in FIG. 1, the vapor separator 166 desirably lies between the front end of the engine 102 and the main fuel tank 36. The vapor separator 166 thus lies in an air flow stream between the air ducts 26 and 74 and near the air flow into the induction system. The air flow over the vapor separator 166 tends to cool the fuel flowing therethrough.

With reference to FIGS. 5–10, combustion chambers of a presently preferred embodiment of the engine 102 are shown therein. As shown in FIG. 5, each cylinder 111 within the engine 102 is defined by cylinder bore 242 provided within the cylinder block 110. The cylinder bore 242 desirably is formed so as to allow the piston 114 to reciprocate within the cylinder bore 242. At its lower end, as viewed in FIG. 5, the cylinder bore 242 communicates with an exhaust port 244 and a scavenging port 246.

The exhaust port 244 communicates with the exhaust manifold 134 as shown in FIG. 1. The scavenging port 246 communicates with a variable volume chamber defined within the crankcase 120, in a known manner.

At the upper end of the cylinder bore 242, a fuel chamber 248 is formed as a recess on an inner surface of the cylinder head 112. The fuel injector 162 is mounted to the cylinder head 112 so as to communicate with the fuel chamber 248. Additionally, the spark plug 238 is mounted to the cylinder head 112 such that an electrode 250 of the spark plug 238 extends into the fuel chamber 248.

As shown in FIG. 5, the piston 114 includes a piston head 252 having an upper surface 254. The upper surface 254 has a radius of curvature 256 about a center of curvature 258. The center of curvature 258 is positioned generally along the center line 243 of the cylinder bore 242 such that a top 260 of the upper surface 254 of the piston head 252 is defined by the intersection of the center line 243 with the upper surface 254.

Figure 6:
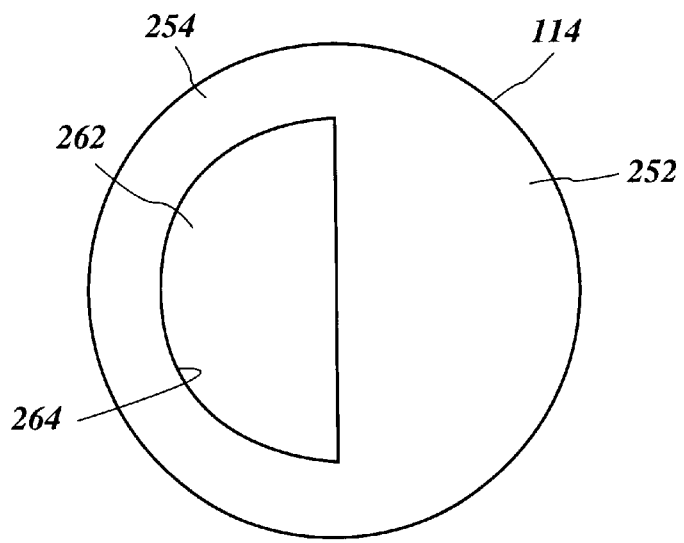
FIG. 6 is a top plan view of the piston head shown in FIG. 5.

The upper surface 254 of the piston head 252 includes a shallow recess 262. The shallow recess 262 includes an outer peripheral portion 264 that is generally concave in shape. As shown in FIG. 6, the shallow recess 262 defines a generally semicircular area on the upper surface 254 of the piston head 252.

As shown in FIG. 5, the fuel injector 162 is configured to discharge a spray of fuel having a spray angle 266 that is preferably between 45° and 70°. The fuel injector 162 is arranged such that an outer periphery 268 of the fuel spray is directed at the outer peripheral portion 264 of the shallow recess 262.

In operation, the piston 114 reciprocates within the cylinder bore 42 in response to the combustion process. As the piston 114 travels upwardly, as viewed in FIG. 5, the piston reaches the position shown in FIG. 5, where the upper surface 254 closes the exhaust port 244. When the piston 114 is in this position, a compression zone 270 is defined by the volume of space bordered by the cylinder bore 242, the upper surface 254 of the piston 114 and the fuel zone 248. That is, the variable-volume combustion chamber reduces in size with the movement of the piston toward top dead center and contains the compression zone 270 once the piston has closed the exhaust port 244.

At a point in time after the piston reaches the position shown in FIG. 5, the fuel injector is activated so as to spray fuel into the compression zone 270 so as to mix fuel with the induction air trapped therein. The fuel is discharged as the piston 114 moves upwardly through the cylinder bore 242. As the piston 114 moves upwardly, the fuel spray interacts with the shallow recess 262 and the outer peripheral portion 264 defined therein, so as to direct a flow of fuel air mixture 272 upwardly toward the fuel chamber 248. Similarly, at a side of the compression zone 270 opposite the fuel injector 162, a flow of fuel air mixture 274 is also directed upwardly due to the interaction of the fuel spray, the upper surface 254 of the piston head 252 and the cylinder bore 242.

By shaping the shallow recess 262 as such, the swirl and mixture of fuel and air within the compression zone 270 is enhanced. For example, by causing the flow of fuel to curve upwardly, the fuel and air mixture within the compression zone 270 is urged to swirl within the compression zone 270, thereby enhancing the mixture of fuel and air, thus reducing the likelihood that droplets of fuel will form, and enhancing the combustibility of the fuel air mixture and the propagation of the combustion flame.

Figure 7:
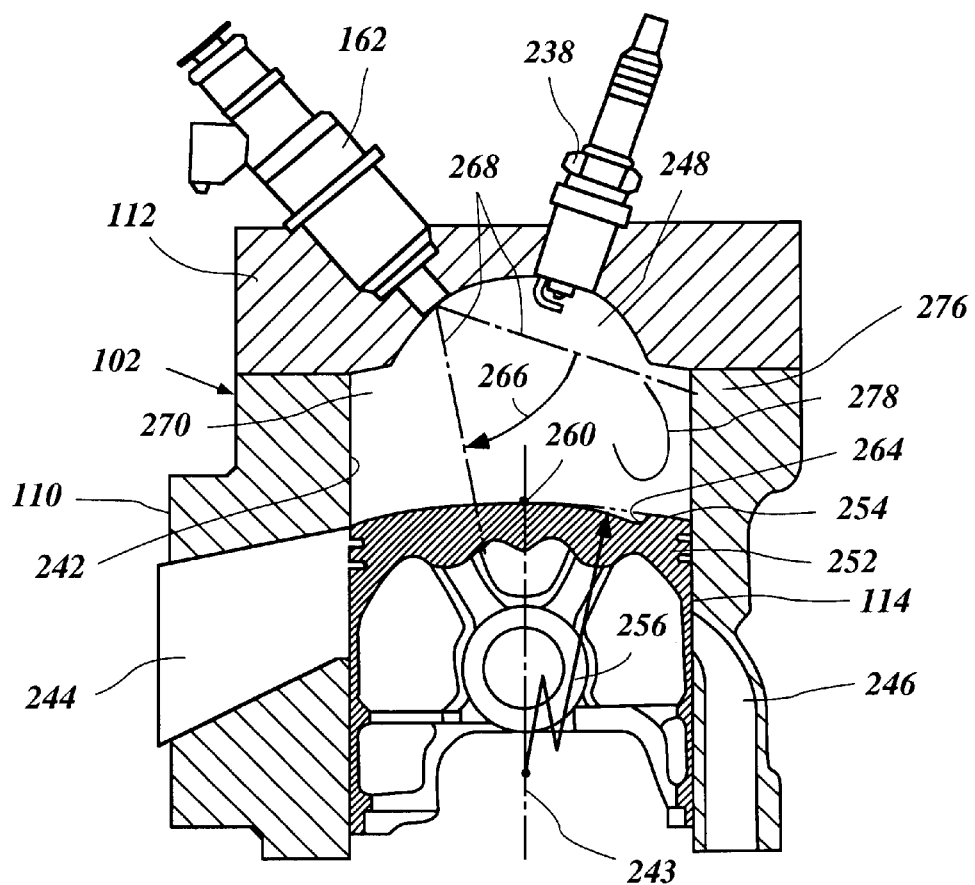
FIG. 7 is a cross-sectional view of a variation of the embodiment shown in FIG. 5.
Figure 8:
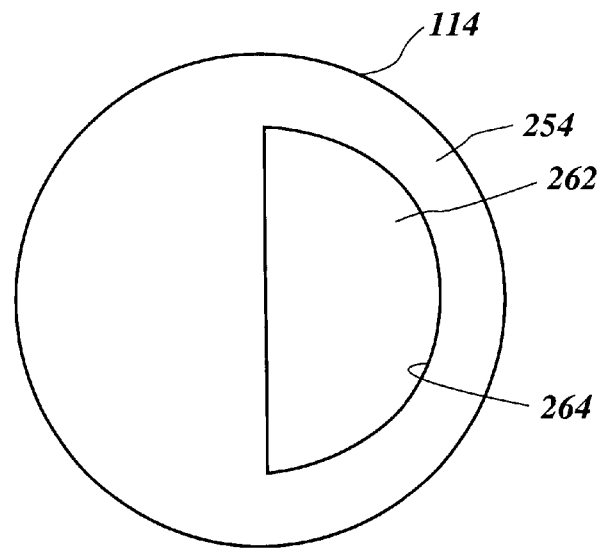
FIG. 8 is a top plan view of the piston head shown in FIG. 7.

With reference to FIGS. 7 and 8, the fuel injector 162 may be mounted to the cylinder head 112 such that at least a portion of the outer periphery 268 of the fuel spray is directed at an upper portion 276 of the cylinder bore 242. With the fuel injector 162 oriented as such, it is preferable to arrange the shallow recess 262 at a side of the center line 243 that is opposite the fuel injector 162. As such, the fuel air mixture within the compression zone 270 forms an upward swirling flow 278 as the piston 114 moves upwardly within the cylinder bore 242.

Figure 9:
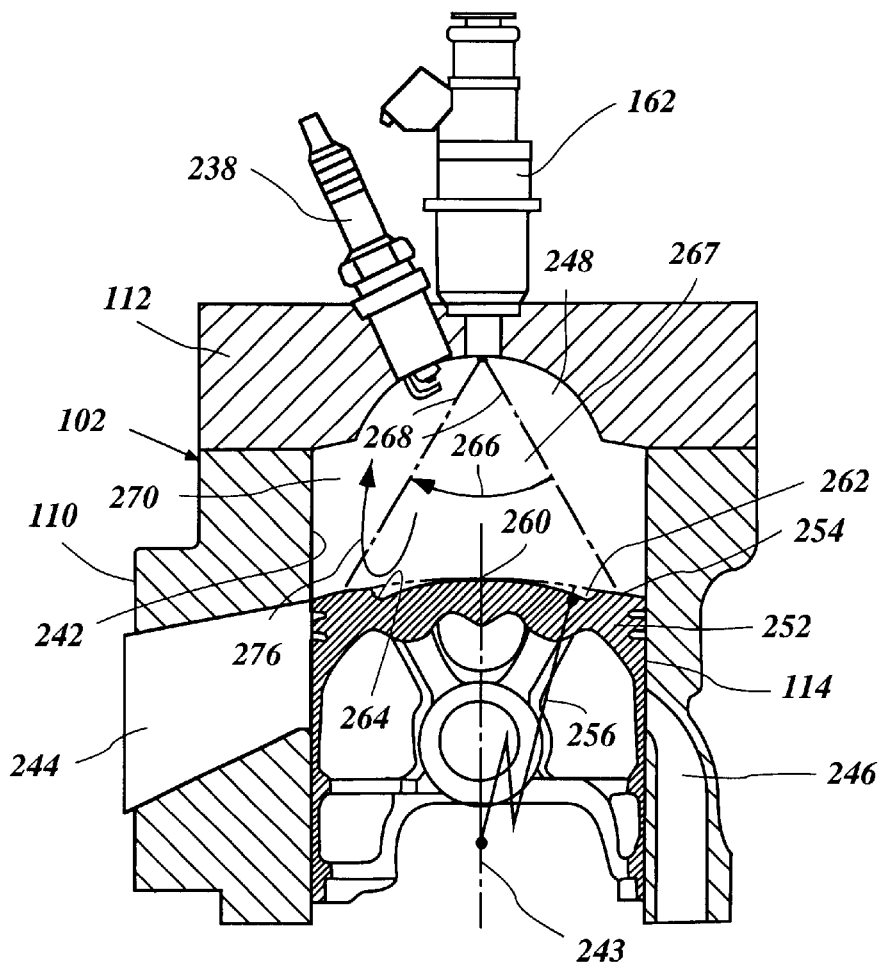
FIG. 9 is a cross-sectional view of a further variation of the embodiment shown in FIG. 5.
Figure 10:
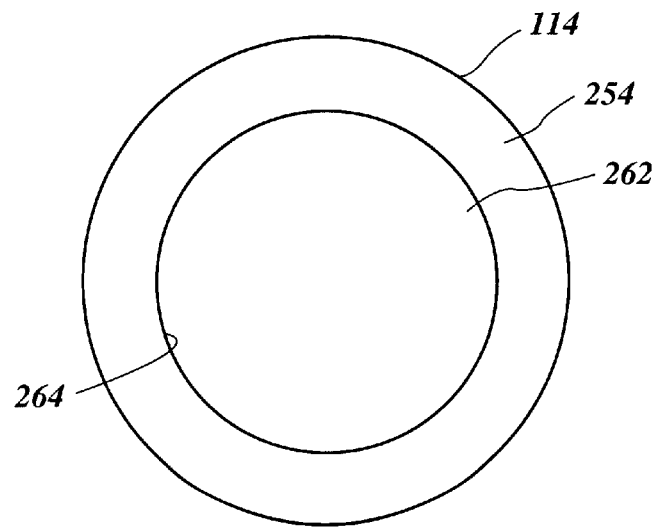
FIG. 10 is a top plan view of the piston head shown in FIG. 9.

With reference to FIGS. 9 and 10, the fuel injector 162 may be arranged such that the fuel spray 267 is generally centered about the cylinder bore center line 243. As shown in FIG. 9, with the fuel injector 162 oriented as such, the shallow recess 262 preferably is formed such that the outer periphery 264 is annular in shape, as viewed in FIG. 10, so as to extend completely around the center line 243.

In operation, with the shallow recess 262 formed generally symmetrically about the center line 243, upward flows of fuel 276 are formed substantially uniformly around the inner periphery of the compression zone 270. Thus, swirling of the air fuel mixture is enhanced during the upward movement of the piston 114 within the cylinder bore 242.

Figure 11:
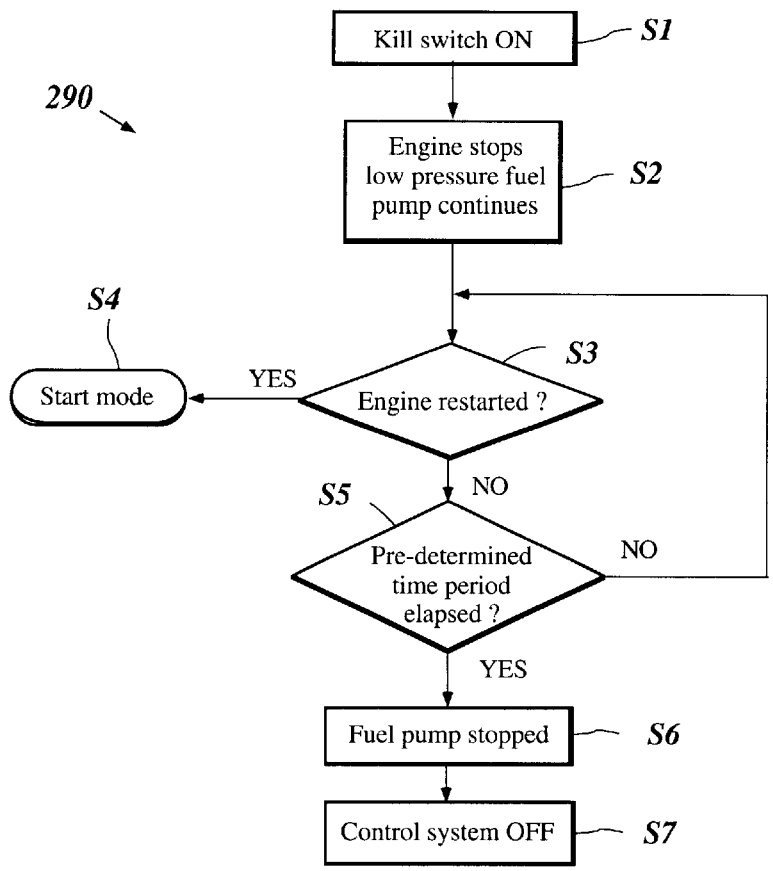
FIG. 11 is a flow diagram of a fuel system control routine.

In accordance with an aspect of the present invention, the watercraft 10 includes a fuel pump controller 280 which is configured to control the electric fuel pump 180 in accordance with a control routine 290, as illustrated in FIG. 11. As shown in FIG. 4, the fuel pump controller 280 is connected to the electric fuel pump 180 via a fuel pump control line 282. Additionally, the fuel pump controller 280 is connected to the kill switch 52 via a kill switch data line 284. While the fuel pump controller 280 is schematically illustrated apart from the ECU 220, the fuel pump controller and/or the fuel pump controller's functions can be integrated into the ECU 220.

With reference to FIG. 4, the fuel pump controller 280 is also connected to another portion of the engine 102 in order to receive data from the engine 102 regarding whether or not the engine has been started. For example, the fuel pump controller 280 may be connected to the ECU 220 via engine data line 287 to receive data from the ECU 220 regarding the operating status of the engine 102. Alternatively, the fuel pump controller 280 may be connected to the ECU 236 via an ignition data line 287 to receive information regarding the status of the ignition control of the engine 102. The fuel pump controller 280 may also be connected to the crank angle position sensor 224 via engine speed data line 289. As is apparent to one of ordinary skill in the art, any one of these devices could be used for signaling the fuel pump controller 280 that the engine 102 has been started. Alternatively, the fuel pump controller 280 could be connected to numerous other devices within the engine 102 to determine whether the engine has been started.

FIG. 11 shows a first control subroutine 290 for practicing the present control scheme for the fuel injection system. The control routine 290 is initiated when the engine 102 is running and the kill switch is depressed. As shown in FIG. 11, the control routine 290 starts at a step S1 and determines whether the kill switch has been activated. If the kill switch has been activated, the program moves on to a step S2, during which the engine stops.

At the step S2, the controller 280 causes the electric fuel pump 180 to continue to operate after the engine has stopped. From this point forward, the electric fuel pump 180 is driven by an electric motor drawing power from an electric storage device such as a battery (not shown). After the electric fuel pump 180 has been signaled to continue to operate, the control routine 290 moves to a step S3.

At the step S3, it is determined whether the engine 102 has been restarted. In order to determine whether the engine has been restarted, the fuel pump controller 280 may use data from the crank angle position sensor 224, the ECU 220 or the ignition controller 236. Alternatively, as described above, the fuel pump controller 280 may use data from any appropriate portion of the engine 102, as is apparent to one of ordinary skill in the art. If it is determined that the engine has been restarted, the control routine 290 moves on to a step S4 where the high pressure fuel pump 206, the ECU 220, the ignition controller 236 and the starter motor (not shown) are operated to restart the engine in a known manner.

If, however, at the step S3, it is determined that the engine has not been restarted, the control routine 290 moves on to a step S5 to determine if a predetermined time period has elapsed. The predetermined time period preferably is set at a time period that is sufficient to allow a user of the watercraft 10 to perform an operation such as docking.

Preferably, the predetermined time period is set to approximately 30 seconds. If it is determined, at the step S5, that the predetermined time period has not elapsed, the control routine 290 returns to the step S3 and repeats.

If, however, it is determined that the predetermined time period has elapsed, the routine 290 moves on to a step S6 where the electric fuel pump 180 is stopped. During the step S6, the fuel pump controller 280 signals the electric fuel pump 180 to stop operating. In the preferred embodiment, the fuel pump controller 280 signals an electric motor which drives the electric fuel pump 180 to stop operating via the fuel pump control line 282.

After the step S6, the control routine 290 moves on to a step S7, where the fuel pump controller 280 is powered off.

The fuel pump controller 280 may be in the form of a hard wired feedback control circuit, as schematically represented in FIG. 4. Alternatively, the fuel pump controller 280 may be constructed of a dedicated processor and a memory for storing a computer program configured to perform the steps S1–S7. Additionally, the fuel pump controller 280 may be constructed of a general purpose computer having a general purpose processor and a memory for storing a computer program for performing the routine 290. Preferably, however, the fuel pump controller 280 is incorporated into the ECU 220, in any of the above-mentioned forms.

In operation, the fuel pump controller 280 is triggered when a user operates the kill switch 52. For example, when a user operating the watercraft 10 is approaching a dock, for example, the user may repeatedly and quickly start and stop the engine 102, using restart button and the kill switch alternately. By repeatedly stopping and starting the engine, the watercraft 10 can be moved closer to a dock at a speed slower than that achieved by the watercraft 10 when the engine 102 is idling. Thus, a docking maneuver may be performed in a slow and incremental manner. However, as described above, in order for a direct cylinder injected engine to operate, fuel is injected into the cylinders under high pressure.

As noted above, high pressure fuel pumps for direct cylinder injected engines typically operate at approximately 50 kg/cm². When a direct cylinder injection engine is stopped, however, the fuel pressure on the input side of the high pressure fuel pump drops quickly. As the pressure drops on the input side of the pump, the fuel drains away from the impeller housed within the pump, thus allowing the pump to fall quickly into an unprimed state. When such a direct cylinder injected engine is subsequently re-started, there is time lag during which the electric fuel pump operates before the high pressure fuel pump may be re-primed, and return to normal operation. This time lag lasts for approximately one second for certain known engines, and makes it more difficult for a user to stop and restart the engine in a quick and efficient manner, thus making docking maneuvers more difficult.

By configuring the fuel pump controller 280 to perform the control routine 290, the present fuel injection control reduces the time lag in fuel pressurization by continuing the operation of the electric fuel pump after the engine has been stopped, for a predetermined period of time. Therefore, when a user is performing a docking maneuver, the user can stop and restart the engine more quickly and efficiently, thereby making docking maneuvers easier to perform.

Figure 12:
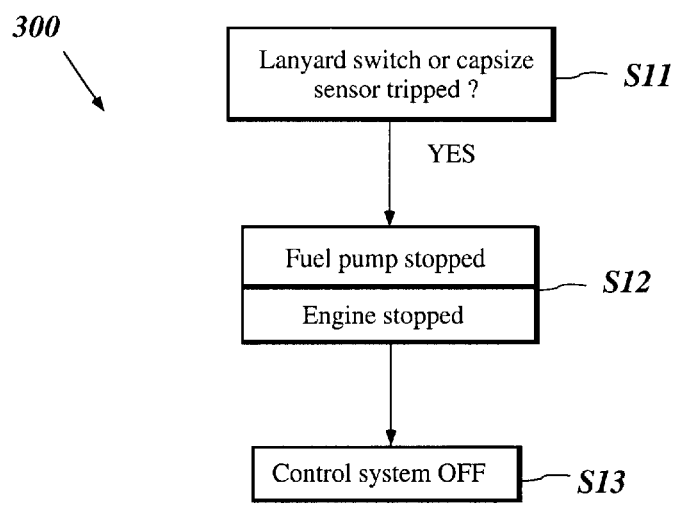
FIG. 12 is a block diagram of another fuel system control routine.

With reference to FIG. 12, the fuel pump controller 280 may optionally be configured to perform a second subroutine 300. Thus, the controller 280 desirably is connected to the lanyard assembly button 62 via a lanyard switch data line 294. Additionally, the fuel pump controller 280 desirably is connected to a watercraft orientation sensor 298 via a data line 296.

With reference to FIG. 12, the control routine 300 is initiated at step S11 when either the lanyard assembly button 62 has been tripped or the sensor 298 indicates that the watercraft 10 has been capsized. In one mode of the present fuel injection control system, this sensor 298 also can determine when the watercraft is oriented in a non-upright position. At step S11, if it is determined that either of the lanyard button 62 has been triggered or the sensor 98 have been tripped when the watercraft assumes a undesirably orientation (possibly for a particular time period), the routine 300 moves on to step S12.

At step S12, the fuel pump controller 280 signals the electric fuel pump 180 to stop via the fuel pump control line 282. Additionally, the engine is stopped by signaling the ECU 220 and/or the ECU 236 via engine data line 286. After the fuel pump 180 and the engine have been signaled to stop, the control routine 300 moves to a step S13 where the fuel pump controller 280 is powered off.

By configuring the controller 280 to perform the routine 300, the present fuel injection system conserves energy and enhances the safe operation of the watercraft 10. For example, if the lanyard switch 48 or the sensor 298 are tripped, it is not likely that the user will be able to remount the watercraft 10 and depress the starter switch 50 in less than 30 seconds. Additionally, if the user rider leaves the rider's area 24, or the watercraft has been capsized, it is desirable to avoid the pressurization of the fuel system unnecessarily. Therefore, by stopping the fuel pump after the lanyard switch 48 or the sensor 298 has been tripped, the present fuel injection control system prevents the fuel system 161 from remaining pressurized after the engine has been stopped and thereby reduces the likelihood that fuel may leak from the fuel system 161 while the watercraft 10 is capsized.

Although this invention has been described in terms of a certain preferred embodiment, other embodiments apparent to those of ordinary skill in the art are also within the scope of this invention. For instance, various aspects of the present invention can be employed with fuel injection systems that inject fuel into other locations of the induction path other than the combustion chamber, e.g., into the intake pipe or scavenge passage. Accordingly, the scope of the invention is intended to be defined only by the claims that follow.

What is claimed is:

1. A method of operating a fuel injected internal combustion engine having an engine body defining at least one combustion chamber, a fuel injector configured to selectively provide a fuel charge to the combustion chamber, a fuel pump configured to deliver fuel to the fuel injector, and a controller coupled to the fuel pump, the method comprising operating the fuel pump while the engine is running, operating the fuel pump for a predetermined time period after the engine has been stopped, and stopping the fuel pump after the predetermined time period has elapsed, wherein the engine additionally comprises a high pressure fuel pump configured to generate fuel pressurized to a pressure sufficient for direct cylinder injection, the method additionally comprising supplying the high pressure fuel pump with fuel from the fuel pump.

2. The method according to claim 1 additionally comprising directly injecting fuel from the high pressure fuel pump into the combustion chamber.

3. A fuel injected, internal combustion engine comprising an engine body defining at least one combustion chamber, a fuel injector configured to provide a fuel charge to the combustion chamber, a first fuel pump configured to deliver fuel to the fuel injector, and a controller coupled to the fuel pump, the controller being configured to operate the fuel pump for a predetermined time period after the engine has been stopped, and a high pressure fuel pump configured to generate fuel pressurized to a pressure sufficient for direct injection and provided downstream from the fuel pump in a fuel flow direction leading from the fuel pump to the fuel injector.

4. A fuel injected, internal combustion engine comprising an engine body defining at least one combustion chamber, a fuel injector configured to provide a fuel charge to the combustion chamber, a first fuel pump configured to deliver fuel to the fuel injector, and a controller coupled to the fuel pump, the controller being configured to operate the fuel pump for a predetermined time period after the engine has been stopped, wherein the controller is configured to stop the fuel pump when the watercraft is capsized.

5. The engine according to claim 4 additionally comprising a sensor configured to detect when the watercraft is capsized, the sensor communicating with the controller.

6. A watercraft having a hull supporting a propulsion device, and a fuel injected, internal combustion engine configured to drive the propulsion device, the engine comprising an engine body defining at least one combustion chamber, a fuel injector configured to selectively deliver a fuel charge to the combustion chamber, a first fuel pump configured to deliver fuel to the fuel injector, and a controller coupled to the fuel pump, the controller being configured to operate the fuel pump for a predetermined time period after the engine has been stopped, wherein the controller is configured to stop the first fuel pump when the watercraft is capsized.

7. The watercraft according to claim 6 additionally comprising a sensor configured to detect when the watercraft is capsized, the sensor communicating with the controller.

* * * * *